(12) United States Patent
Sugihara

(10) Patent No.: US 7,651,637 B2
(45) Date of Patent: Jan. 26, 2010

(54) DOPANT SOLUTION FOR AN ELECTROCONDUCTIVE POLYMER, AN OXIDANT AND DOPANT SOLUTION FOR AN ELECTROCONDUCTIVE POLYMER, AN ELECTROCONDUCTIVE COMPOSITION AND A SOLID ELECTROLYTIC CAPACITOR

(75) Inventor: Ryosuke Sugihara, Izumioutsu (JP)

(73) Assignees: Tayca Corporation, Osaka-shi (JP); NEC TOKIN Corporation, Sendai-shi (JP)

( * ) Notice: Subject to any disclaimer, the term of this patent is extended or adjusted under 35 U.S.C. 154(b) by 372 days.

(21) Appl. No.: 11/815,814

(22) PCT Filed: Feb. 3, 2006

(86) PCT No.: PCT/JP2006/302307

§ 371 (c)(1),
(2), (4) Date: Aug. 8, 2007

(87) PCT Pub. No.: WO2006/085601

PCT Pub. Date: Aug. 17, 2006

(65) Prior Publication Data

US 2009/0020730 A1    Jan. 22, 2009

(30) Foreign Application Priority Data

Feb. 8, 2005 (JP) ............................. 2005-031194
Oct. 28, 2005 (JP) ............................. 2005-314517

(51) Int. Cl.
*H01B 1/00* (2006.01)
*C08G 75/00* (2006.01)
*C08G 73/00* (2006.01)
*C08G 73/06* (2006.01)
*H01G 9/00* (2006.01)

(52) U.S. Cl. ....................... 252/500; 528/377; 528/422; 528/423; 361/523

(58) Field of Classification Search .................. 252/500; 528/377, 422, 423; 361/523
See application file for complete search history.

(56) References Cited

U.S. PATENT DOCUMENTS 5,624,605 A * 4/1997 Cao et al. .................... 252/500
5,637,652 A   6/1997 Kato et al.
2005/0082514 A1 4/2005 Yoshimoto et al.

FOREIGN PATENT DOCUMENTS

| JP | 748437 A | 2/1995 |
| JP | 7330901 A | 12/1995 |
| JP | 2003158043 A | 5/2003 |
| JP | 2003160647 A | 6/2003 |
| JP | 2004349525 A | 12/2004 |
| WO | 03071559 A1 | 8/2003 |
| WO | 2004075220 A1 | 9/2004 |

OTHER PUBLICATIONS

International Search Report of PCT/JP2006/302307, date of mailing Mar. 7, 2006.

* cited by examiner

*Primary Examiner*—Mark Kopec
*Assistant Examiner*—Jaison P Thomas
(74) *Attorney, Agent, or Firm*—Westerman, Hattori, Daniels & Adrian, LLP

(57) ABSTRACT

The present invention provides: a dopant solution for an electroconductive polymer characterized in that it comprises at least one selected from the group consisting of alkylamine salts and imidazole salts of benzene skeleton sulfonic acids and naphthalene skeleton sulfonic acids, having at least one OH group and at least one sulfonate group, at a concentration of 40 mass % or more; an oxidant and dopant solution for an electroconductive polymer including a mixture of the organic salt of the dopant as mentioned above, and a persulfate organic salt as an oxidant; an electroconductive composition including an electroconductive polymer prepared by using the oxidant and dopant solution as mentioned above; and solid electrolytic capacitor using the electroconductive composition as a solid electrolyte. The electroconductive composition has an improved electric conductivity, and the solid electrolytic capacitor has an improved reliability for a long time.

38 Claims, No Drawings

DOPANT SOLUTION FOR AN ELECTROCONDUCTIVE POLYMER, AN OXIDANT AND DOPANT SOLUTION FOR AN ELECTROCONDUCTIVE POLYMER, AN ELECTROCONDUCTIVE COMPOSITION AND A SOLID ELECTROLYTIC CAPACITOR

TECHNICAL FIELD

The present invention relates to a dopant solution for an electroconductive polymer, an oxidant and dopant solution including the dopant and the oxidant, an electroconductive composition including an electroconductive polymer polymerized by using the oxidant and dopant solution, and a solid electrolytic capacitor using the electroconductive composition as a solid electrolyte.

BACKGROUND ART

The market of a solid electrolytic capacitor using an electroconductive polymer served as a solid electrolyte has been rapidly enhanced because it has various superior properties including reduced equivalent series resistance (ESR) and improved reliability, compared with conventional solid electrolytic capacitors using manganese dioxide as a solid electrolyte.

The electroconductive polymer is usually prepared by a chemical oxidation polymerization method. For example, as an oxidant and dopant or a transition metal salt of an organic sulfonic acid, such as iron paratoluene sulfonate, is used, while a monomer such as thiophene or derivatives thereof is polymerized. (See JP Laid-open patent publication Nos. JP10-50558 and JP2000-106331.)

However, these methods are useful in mass production, but there is an objective that the transition metal served as an oxidant remains in the electroconductive polymer. In order to remove the transition metal, a washing process is applied, but even if washing it, it is inherently difficult to completely remove the transition metal due to its property. When the transition metal remains in the electroconductive polymer, the transition metal affects the electroconductive polymer or a solid electrolytic capacitor using it as a solid electrolyte. Therefore, it has been required to get rid of the affects on the solid electrolytic capacitor to further improve the stability of the electroconductive polymer to assure the long-term reliability of the solid electrolytic capacitor. To the end, an oxidant other than a transition metal salt has been proposed, such as a peroxide as an alternative oxidant. However, a monomer such as thiophene or a derivative thereof is used, the reactivity becomes significantly low and the electric conductivity of the electroconductive polymer as obtained is much lower than those when using a transition metal salt

SUMMARY OF THE INVENTION

The present invention solves the objectives of the prior art, providing an electroconductive composition having a high electric conductivity, as well as a solid electrolytic capacitor having a long-term reliability when using the electroconductive composition as a solid electrolyte. The present invention also provides an oxidant and dopant solution, and a dopant solution forming the oxidant and dopant solution, in which an electroconductive composition having a high electric conductivity can be produced.

The objectives of the present invention can be accomplished as follows: As a dopant, at least one selected from the group consisting of an alkylamine salt and an imidazole salt of a benzene skeleton sulfonic acid or a naphthalene skeleton sulfonic acid, having at least one OH group and at least one sulfonate group is used. A mixture of the organic salt of the dopant and a persulfate organic salt is used as an oxidant and dopant. A monomer having a heterocyclic ring structure, such as thiophene and derivatives thereof, pyrrole and derivatives thereof, and aniline and derivatives thereof, is polymerized to prepare an electroconductive composition. The electroconductive composition is used as a solid electrolyte to form a solid electrolytic capacitor.

That is, the present invention is characterized in that a dopant solution for an electroconductive polymer includes at least one selected from the group consisting of an alkylamine salt and an imidazole salt of a benzene skeleton sulfonic acid or a naphthalene skeleton sulfonic acid, having at least one OH group and at least one sulfonate group, at a concentration of 40 mass % or more.

According to the present invention, a mixture of a dopant and oxidant is dissolved. The mixture includes at least one selected from the group consisting of an alkylamine salt and an imidazole salt of a benzene skeleton sulfonic acid or a naphthalene skeleton sulfonic acid, having at least one OH group and at least one sulfonate group; and a persulfate organic salt. The persulfate organic salt is included at an amount of 0.3 to 2.0 moles, per one mole of the one selected from the group consisting of an alkylamine salt and an imidazole salt of a benzene skeleton sulfonic acid or a naphthalene skeleton sulfonic acid, having at least one OH group and at least one sulfonate group.

Also, the present invention provides an electroconductive composition. A mixture of at least one selected from the group consisting of an alkylamine salt and an imidazole salt of a benzene skeleton sulfonic acid or a naphthalene skeleton sulfonic acid, having at least one OH group and at least one sulfonate group, and a persulfate organic salt is used as an oxidant and dopant. A monomer, selected from the group consisting of thiophene and derivatives thereof, pyrrole and derivatives thereof, and aniline and derivatives thereof, is polymerized to form an electroconductive polymer. The electroconductive composition of the present invention includes the electroconductive polymer.

Further, the present invention provides a solid electrolytic capacitor. A mixture of at least one selected from the group consisting of an alkylamine salt and an imidazole salt of a benzene skeleton sulfonic acid or a naphthalene skeleton sulfonic acid, having at least one OH group and at least one sulfonate group, and a persulfate organic salt is used as an oxidant and dopant. A monomer, selected from the group consisting of thiophene and derivatives thereof, pyrrole and derivatives thereof, and aniline and derivatives thereof, is polymerized to form an electroconductive polymer. The solid electrolytic capacitor of the present invention includes an electroconductive composition including the electroconductive polymer as a solid electrolyte.

The electroconductive composition of the present invention includes, as a main component, a polymer from the monomer, selected from the group consisting of thiophene and derivatives thereof, pyrrole and derivatives thereof, and aniline and derivatives thereof. The monomer is subjected to an oxidation polymerization by an oxidation action generated by the oxidant part in the specific oxidant and dopant, so as to incorporate the dopant to make it conductive. In the present invention, the resultant is not referred to as an electroconductive polymer, but to as an electroconductive composition. This is because the oxidant and dopant does not include any metal salt. Thus, even if unreacted components or reaction residues remains at a small amount in the polymer of the monomer (monomer being selected from the group consisting of thiophene and derivatives thereof, pyrrole and derivatives thereof, and aniline and derivatives thereof), the polymer from the monomer is not adversely affected by them, so that the electroconductive composition of the present invention has equivalent properties and its use as the so-called electroconductive polymer composition. The electroconductive composition of the present invention can be used, including the unreacted components or reaction residues, without purification to remove them. In other words, the electroconductive composition of the present invention means not only the electroconductive polymer per se as a main component (a polymer in which a monomer selected from the group consisting of thiophene and derivatives thereof, pyrrole and derivatives thereof, and aniline and derivatives thereof is polymerized to incorporate the specific dopant), but also ones including the unreacted components or reaction residues at a small amount.

The electroconductive composition of the present invention has a high electric conductivity and a less decrease in the electric conductivity during storage. The solid electrolytic capacitor using the electroconductive composition as a solid electrolyte is less likely to change the properties during storage, assuring a long-term reliability. According to the oxidant and dopant solution of the present invention, the electroconductive composition can be prepared at a high reactivity. The dopant solution of the present invention can form the oxidant and dopant solution in accordance with the present invention.

That is, in preparing the electroconductive composition of the present invention, a mixture including an alkylamine salt and an imidazole salt of an organic sulfonic acid, and a persulfate organic salt is used as an oxidant and dopant. In the oxidant and dopant, a metal salt which can promote deterioration of the electroconductive polymer is not included. The oxidant and dopant, as used, has a high solubility, so that in the presence of an oxidant and dopant at a high concentration, a monomer, selected from the group consisting of thiophene and derivatives thereof, pyrrole and derivatives thereof, and aniline and derivatives thereof, can be polymerized. Thus, a monomer, selected from the group consisting of thiophene and derivatives thereof, pyrrole and derivatives thereof, and aniline and derivatives thereof, can be efficiently polymerized. Therefore, the electroconductive composition can be prepared at a high reactivity, to have a high electric conductivity. Also, the electroconductive composition is used as a solid electrolyte, so as to provide a solid electrolytic capacitor having a long-term reliability compared with conventional products.

The electroconductive composition of the present invention has a high electric conductivity though it excludes a metal salt, so as to avoid rapid deterioration as seen in the conventional electroconductive compositions. Thus, mainly, it can be used as a solid electrolyte for a solid electrolytic capacitor. Other than that, it can be conveniently used for, e.g., antistatic agents such as antistatic sheets, antistatic paints and antistatic resins, and corrosion-resistant agents such as corrosion-resistant paints.

PREFERRED EMBODIMENTS TO CARRY OUT THE INVENTION

The dopant solution for an electroconductive polymer of the present invention is useful for preparing an oxidant and dopant solution for an electroconductive polymer of the present invention. As a component, at least one selected from the group consisting of an alkylamine salt and an imidazole salt of a benzene skeleton sulfonic acid or a naphthalene skeleton sulfonic acid, having at least one OH group and at least one sulfonate group is used.

As the benzene skeleton sulfonic acid or naphthalene skeleton sulfonic acid having at least one OH group and at least one sulfonate group, the following compounds are exemplified: phenolsulfonic acid, phenoldisulfonic acid, cresolsulfonic acid, catecholsulfonic acid, dodecylphenolsulfonic acid, sulfosalicylic acid, naphtholsulfonic acid, naphtholdisulfonic acid, naphtholtrisulfonic acid, and so on. As an alkylamine forming an alkylamine salt of the benzene skeleton sulfonic acid or naphthalene skeleton sulfonic acid, one having an alkyl group with a carbon number of 1 to 12 can be used, which can include methylamine, ethylamine, propylamine, butylamine, octylamine, dodecylamine, 3-ethoxypropylamine, 3-(2-ethylhexyloxy)propylamine and so on.

As an imidazole to form the imidazole salt of the benzene skeleton sulfonic acid or the naphthalene skeleton sulfonic acid, imidazole itself or one in which a part of the hydrogen atom on the imidazole ring is substituted with an alkyl group or a phenyl group having a carbon number of 1 to 20 can be used. That is, according to the present invention, the phrase "imidazole salt of a benzene skeleton sulfonic acid or a naphthalene skeleton sulfonic acid, having at least one OH group and at least one sulfonate group" can include not only an imidazole salt of a benzene skeleton sulfonic acid or a naphthalene skeleton sulfonic acid having at least one OH group and at least one sulfonate group, but also an imidazole derivative salt of a benzene skeleton sulfonic acid or a naphthalene skeleton sulfonic acid having at least one OH group and at least one sulfonate group. (For example, an imidazole derivative can include one in which a part of the hydrogen atom on the imidazole ring is substituted with an alkyl group or a phenyl group.)

In a case where the imidazole, forming an imidazole salt of a benzene skeleton sulfonic acid or a naphthalene skeleton sulfonic acid, has a substituted group of an alkyl group or a phenyl group having a carbon number of 1 to 20, the second position or the fourth position of the imidazole ring can be substituted because of the manufacturing cost and the good productivity.

The preferable examples of the imidazole, forming the imidazole salt of the benzene skeleton sulfonic acid or the naphthalene skeleton sulfonic acid, can include imidazole, 1-methylimidazole, 2-methylimidazole, 2-ethylimidazole, 2-butyl imidazole, 2-undecylimidazole, 2-phenylimidazole, 4-methylimidazole, 4-undecylimidazole, 4-phenylimidazole, 2-ethyl-4-methylimidazole, and 1,2-dimethylimidazole. Among them, imidazole, 2-methylimidazole and 4-methylimidazole can be used particularly.

As a solvent of the dopant solution, water can be usually used, but an aqueous solution including a hydrophilic organic solvent such as ethanol at a concentration as high as 50 volume % can be also used.

In the dopant solution, the concentration of the one selected from the group consisting of an alkylamine salt and an imidazole salt of a benzene skeleton sulfonic acid or a naphthalene skeleton sulfonic acid, having at least one OH group and at least one sulfonate group, can be 40 mass % or more, and in particular, 70 mass % or more. In a case where the dopant solution is in a high concentration as described above, an oxidant and dopant solution to form the electroconductive composition is superior in the conductivity at a high reactivity as prepared. (The oxidant and dopant solution of the present invention will be explained below.) It should be noted that the upper limit of the concentration of the one selected from the group consisting of an alkylamine salt and an imidazole salt of a benzene skeleton sulfonic acid or a naphthalene skeleton sulfonic acid, having at least one OH group and at least one sulfonate group can be 90 mass % in the dopant solution.

The pH of the dopant solution can be 1 or more, and in particular, 4 or more. In preparing an electroconductive composition useful for an aluminum solid electrolytic capacitor, the pH of the oxidant and dopant solution can be adjusted to be 1 or more in order to avoid a capacitor element, aluminum solid electrolytic capacitor from solubilizing (as described hereinafter in detail). In case where the dopant solution has a pH value of 1 or more, an oxidant and dopant solution useful in preparing an electroconductive composition for an aluminum solid electrolytic capacitor can be easily provided. The pH of the dopant solution can be 10 or less, and in particular 8 or less.

Also, the dopant solution can include an emulsifier. Inclusion of the emulsifier can provide an oxidant and dopant solution which can homogenously promote the polymerization reaction of the monomer, the monomer being at least one selected from the group consisting of thiophene and derivatives thereof, pyrrole and derivatives thereof, and aniline and derivatives thereof. Various compounds can be used as an emulsifier, but an alkylamine oxide can be particularly used. The alkylamine oxide, even if it remains in the electroconductive composition, does not significantly reduce the electric conductivity of the electroconductive composition, nor remarkably decrease the functions of the capacitor when the electroconductive composition is used as a solid electrolyte of a solid electrolytic capacitor. The alkylamine oxide can include an alkyl group having a carbon number of 1 to 20. As the monomer progresses the polymerization reaction, the pH value of the reaction system is generally decreased, but the alkylamine oxide can serve to restrict the decrease of the pH value.

The oxidant and dopant solution for an electroconductive polymer of the present invention includes a mixture of an alkylamine salt or imidazole salt of a benzene skeleton sulfonic acid or a naphthalene skeleton sulfonic acid having at least one OH group and at least one sulfonate group, and a persulfate organic salt, serving as an oxidant and dopant.

The alkylamine salt or imidazole salt of the benzene skeleton sulfonic acid or the naphthalene skeleton sulfonic acid having at least one OH group and at least one sulfonate group, and the solvent, useful for an oxidant and dopant solution, can be the same as those as described for the dopant solution.

The persulfate organic salt for the oxidant and dopant solution can include ammonium persulfate, alkylamine persulfate, and imidazole persulfate. The alkylamine salt or imidazole salt of the benzene skeleton sulfonic acid or naphthalene skeleton sulfonic acid, useful for the alkylamine salt or imidazole salt, can be the same as those as described before.

The mixture ratio of the alkylamine salt or imidazole salt of the benzene skeleton sulfonic acid or naphthalene skeleton sulfonic acid having at least one OH group and at least one sulfonate group, and the persulfate organic salt can be as follows: The persulfate organic salt is included at an amount of 0.3 moles or more, in particular 0.4 moles or more, and 2.0 moles or less, and in particular 1.5 moles or less, per one mole of one selected from the group consisting of an alkylamine salt and an imidazole salt of a benzene skeleton sulfonic acid or a naphthalene skeleton sulfonic acid, having at least one OH group and at least one sulfonate group. When the mixture ratio of the persulfate organic salt is more than the above, the ratio of the alkylamine salt or imidazole salt of the specific organic sulfonic acid is decreased, thereby increasing the sulfuric ions serving as a dopant. Thus, the electric conductivity of the electroconductive composition, as obtained, can be decreased, affecting the heat resistance. Also, the mixture ratio of the organic persulfate organic salt is less than the above, it tends to be difficult in obtaining a polymer.

In the present invention, the mixture includes an alkylamine salt or imidazole salt of specific organic sulfonic acid and an organic persulfate, which is used as an oxidant and dopant. In the mixture, the alkylamine salt or imidazole salt of the organic sulfonic acid can mainly serve as a dopant, and the organic persulfate can mainly serve as an oxidant. The organic sulfonic acid and the persulfuric acid are ones from organic salts, which do not include a metal salt. Thus, the deterioration of the electroconductive polymer due to the metal salts can be restricted while it is observed in the conventional electroconductive polymer. Also, the organic sulfonic acid is required to have at least one OH group, because the OH group is considered to promote the polymerization reaction as well as to contribute the improvement of the electric conductivity of the obtained electroconductive composition. The reason has not been clearly revealed, but it is considered that the proton of the OH group rapidly promotes the polymerization reaction to incorporate it into a polymer as a dopant. Also, the organic sulfonic acid is required to include at least one sulfonate group, because it is an essential element to give conductivity by serving as a dopant. The reason of the requirements of a benzene skeleton or naphthalene skeleton is because the provision of the organic sulfonic acid with the benzene skeleton or the naphthalene skeleton can improve the heat resistance of the electroconductive composition.

The oxidant and dopant solution of the present invention is explained by the examples of phenol sulfonic acid as a benzene skeleton sulfonic acid, butylamine as an alkylamine, and ammonium persulfate as an organic persulfate. For example, it can be prepared as follows. First, in an aqueous solution of phenol sulfonic acid, butylamine is added to adjust the pH value. Then, in order to remove free phenol, distillation or activated carbon filtration is carried out, so as to obtain a butylamine phenolsulfonate aqueous solution. (That is, the dopant solution for the electroconductive polymer of the present invention) Then, a solution, in which a solid ammonium persulfate is solubilized in water, is mixed with the butylamine phenolsulfonate aqueous solution (That is the dopant solution for the electroconductive polymer of the present invention), so as to obtain an oxidant and dopant solution of the present invention.

For the electroconductive composition of the present invention, a monomer such as one selected from the group consisting of thiophene and derivatives thereof, pyrrole and derivatives thereof, and aniline and derivatives thereof is used. As thiophene and derivatives thereof, examples can include 3,4-ethylenedioxythiophene, 3-alkylthiophene, 3-alkoxythiophene, 3-alkyl-4-alkoxythiophene, 3,4-alkylthiophene, and 3,4-alkoxythiophene. As pyrrole and derivatives thereof, examples can include 3,4-alkylpyrrole, and 3,4-alkoxypyrrole. As aniline and derivatives thereof, examples can include 2-alkylaniline, and 2-alkoxyaniline. The alkyl group or the alkoxy group of the compound can have a carbon number of 1 to 16.

In polymerization of the monomer, one in a liquid state can be used as it is, but in order to promote the polymerization smoothly, the monomer can be diluted with an organic solvent such as methanol, ethanol, propanol, butanol, acetone, and acetonitrile, to be provided in a solution state.

As to the condition for the polymerization of the monomer, various conditions can be used depending on the use of the electroconductive composition. For example, if the electroconductive composition is formed into a film which is to be incorporated into an application device of the electroconductive composition, any conditions can be used. However, when the electroconductive composition is to be used as a solid electrolyte of a solid electrolytic capacitor, the monomer can be polymerized in the presence of the oxidant and dopant solution in the production process of the solid electrolytic capacitor.

As to the condition of the polymerization of the monomer, examples are as follows. (1) An oxidant and dopant solution including a mixture of at least one selected from the group consisting of an alkylamine salt or imidazole salt of a benzene skeleton sulfonic acid or a naphthalene skeleton sulfonic acid having at least one OH group and at least one sulfonate group, and an organic persulfate is dried. Then, a monomer or an organic solution thereof is contacted in order to polymerize the monomer. (2) The oxidant and dopant solution is mixed with a monomer or an organic solution thereof in order to polymerize the monomer. (3) A monomer or an organic solution thereof is instilled in fine pores of a capacitor element, and then, the capacitor element is immersed into an oxidant and dopant solution, in order to polymerize the monomer. On the contrary, a capacitor element is, also, immersed into an oxidant and dopant solution to be instilled into fine pores of a capacitor element, and then, the capacitor element is immersed into a monomer or an organic solution thereof in order to polymerize the monomer. Further, the capacitor element can be alternatively immersed into an oxidant and dopant solution, and the monomer or an organic solution of the monomer solvent, so as to polymerize the monomer. At that time, the capacitor element can be first immersed either in an oxidant and dopant solution, or in a monomer or an organic solution thereof.

Next, these polymerization conditions (1) to (3) are explained in detail.

Polymerization Condition (1)

The oxidant and dopant solution is pored on a plate and heated at a temperature of 0° C. to 50° C., and in particular at a temperature of 10° C. to 30° C., so as to leave it until the surface thereof is dried (for 10 minutes or more). A liquid (organic solution), in which a monomer is diluted to have a concentration of 10 to 100 mass %, and in particular of 20 to 40 mass %, is dropped and to leave it at a temperature of 0 to 50° C., and in particular at a temperature of 10 to 30° C., so as to leave it until the surface thereof is dried (for 5 minutes or more). Alternatively, right after the organic solution of the monomer is dropped to polymerize the monomer until the color of the plate surface is completely changed into black at a temperature of 0 to 120° C., and in particular at a temperature of 30 to 70° C. (for a period of 10 minutes to 1 day, and in particular for a period of 10 minutes to two hours).

Polymerization Condition (2)

As an emulsifier, alkylamine oxide is used. (In detail, dimethyllaurylamine oxide aqueous solution at 35 mass % is used.) The emulsifier is mixed with the oxidant and dopant solution at a mass ratio (the oxidant and dopant solution:emulsifier) of 100:20 to 100:0.01, and in particular 100:10 to 10:0.05. In the solution, thiophene or derivatives thereof is mixed at a concentration of 2 to 50%, and in particular of 10 to 30 mass %. After 30 seconds to 30 minutes, and in particular after 5 minutes to 20 minutes, of the mixing, a capacitor element is immersed into the mixture solution. After 10 seconds to 300 seconds, and in particular after 30 seconds to 120 seconds, the capacitor element is taken out, and it is left at a temperature of 0 to 50° C., and in particular at a temperature of 10 to 30° C. for a period of 30 minutes to 180 minutes, or alternatively, right after taking it out, the following process is carried out: The monomer is polymerized at a temperature of 50 to 200° C. for a period of 10 minutes to 1 day.

Polymerization Condition (3)

The monomer is diluted to be adjusted into a concentration of 5 to 100 mass %, and in particular into a concentration of 10 to 40 mass %, to prepare a solution (organic solution), into which a sintered tantalum is immersed. After a period of 10 seconds to 300 seconds, and in particular after a period of 20 seconds to 120 seconds, the sintered tantalum is taken out from the monomer solution (an organic solution of the monomer). At a temperature of 10 to 60° C., and in particular at a temperature of 10 to 30° C., it is left for a period of 1 minute to 60 minutes and in particular for a period of 1 minute to 10 minutes until the solvent is evaporated in part. Then, the sintered tantalum is immersed into a mixture solution as prepared such that an oxidant and dopant solution is mixed with an emulsifier of 20% dodecylamine oxide solution at a mass ratio of 100:10 to 100:0.01, and in particular at a mass ratio of 100:5 to 100:0.1. After a period of 10 seconds to 300 seconds, and in particular after a period of 10 to 60 seconds, the sintered tantalum is taken out. The sintered tantalum is left at a temperature of 0 to 50° C., and in particular at a temperature of 10 to 30° C., until the surface thereof is dried (for 5 minutes or more), or alternatively, right after the organic solution of the monomer is dripped, the following process is carryout out: The monomer is polymerized at a temperature of 0 to 120° C., and in particular at a temperature of 30 to 70° C., for a period of 10 minutes to 1 day, and in particular for a period of 10 minutes to 2 hours.

The electroconductive composition of the present invention, using the oxidant and dopant solution of the present invention, can be used in a solid electrolytic capacitor such as a tantalum solid electrolytic capacitor, a niobium solid electrolytic capacitor, and an aluminum solid electrolytic capacitor. When, the electroconductive composition of the present invention is used as a solid electrolyte of a solid electrolytic capacitor, as explained before, the monomer can be polymerized in the production process of the solid electrolytic capacitor. In the process, the concentration of the oxidant and dopant solution can affect the yield of the electroconductive composition, that is, the reaction efficiency of the polymerization of the monomer, resulting in the productivity and the properties of the solid electrolytic capacitor. Therefore, the oxidant and dopant concentration in the oxidant and dopant solution can be 25 mass % or more, and in particular 30 mass % or more, and yet in particular 40 mass % or more, and further in particular 55 mass % or more. However, the concentration can be 80 mass % or less.

That is, if the concentration of the oxidant and dopant is less than 25 mass %, the polymerization reaction of the monomer is not effectively progressed, and the reactivity becomes very bad, but if it is 25 mass %, the polymerization reaction can be easily progressed. When it is 30 mass % or more, or when it is 40 mass % or more, satisfactory results for the productivity and the properties of the tantalum solid electrolytic capacitor, niobium solid electrolytic capacitor, aluminum solid electrolytic capacitor and so on can be obtained. When the concentration is 55 mass % or more, the ESR becomes lower, and the capacitance becomes higher, and therefore a capacitor having more satisfactory properties can be prepared. However, if the concentration of the oxidant and dopant solution is 80 mass % or more, the properties can be adversely affected. The oxidant and dopant solution of the present invention can be prepared at a high concentration, which thereby results in improving the productivity of the electroconductive composition, as well as the productivity of the solid electrolytic capacitor.

Also, the pH of the oxidant and dopant solution is important particularly with respect to the aluminum solid electrolytic capacitor. When the pH is less than 1, the dielectric layer is solubilized, and excellent properties can not be expected. Thus, the pH of the oxidant and dopant solution can be 1 or more, and in particular 4 or more, but the pH can be 10 or less, and in particular 8 or less. However, a tantalum solid electrolytic capacitor, a niobium solid electrolytic capacitor and so on are resistant to an acid, so that pH value of 1 or less can be acceptable. Note that in case of using an organic iron sulfonate in producing conventional solid electrolytic capacitors, the pH value is about 0.5, so that it is not always acceptable for producing an aluminum solid electrolytic capacitor.

As the polymerization of the monomer progresses, the pH value in the reaction system is decreased. However, when an alkylamine oxide as an emulsifier for an dopant solution is included in the oxidant and dopant solution (for example, when an oxidant and dopant solution is prepared using a dopant solution including an emulsifier), the alkylamine oxide serves to restrict the pH from decreasing, thereby being advantageous in homogenous progress of the reaction.

In the description above, the concentration of the oxidant and dopant solution is explained especially with respect to the production of a solid electrolytic capacitor. However, the concentration of the oxidant and dopant solution is also important for preparing an electroconductive composition. The concentration of the oxidant and dopant can be 25 mass % or more, and in particular 30 mass % or more, and yet in particular 55% or more, but the concentration can be 80 mass % or less. Also in the production of the solid electrolytic capacitor, as explained before, not only the monomer can be polymerized in the presence of the oxidant and dopant solution, but also the oxidant and dopant solution is caused to polymerization after it is dried and contacted to a monomer. In a case of drying it to contact the monomer, it is more advantageous because the concentration of the oxidant and dopant solution is increased. The concentration can be 25 mass % or more and in particular 30 mass % or more, and yet in particular 55 mass % or more, but the concentration can be 80 mass % or less.

The solid electrolytic capacitor of the present invention can include the electroconductive composition of the present invention as a solid electrolyte, and the components other than that can be used which are conventionally available for a conventional solid electrolytic capacitor.

In the solid electrolytic capacitor of the present invention, the dopant and the constituent monomer of an electroconductive polymer used as a solid electrolyte can be in a ratio of 1:1 to 1:3 by a molar ration (the monomer being at least one selected from the group consisting of thiophene and derivatives thereof, pyrrole and derivatives thereof, and aniline and derivatives thereof).

Synthetic Metals, 101, 561-564 (1999), K. E. Aasmundtveut, reports that when ferric paratoluene sulfonate (III) was used as an oxidant and dopant to polymerize 3,4-ethylenedioxythiophene, which was then washed and dried, and the electroconductive polymer as obtained had a ratio of sulfur (S) and the constituent monomer (3,4-ethylenedioxythiophene) of 1:4 by a molar ratio, regardless of the feed ratio of them. That is, the ratio of the dopant and the constituent monomer was 1:4 by a molar ratio.

On the other hand, the solid electrolytic capacitor of the present invention, as shown in Examples 13 to 15 as explained below, had a ratio of the sulfur (S) of the dopant and the sulfur (S) of the constituent monomer at a molar ratio of 1:1 to 1:3. The increase of the dopant with respect to the constituent monomer is considered to contribute the improvement of the electric conductivity of the electroconductive polymer as obtained. In other words, in case of using the oxidant and dopant of the present invention, the ratio of the dopant with respect to the monomer in the obtained electroconductive polymer can be increased, compared with those using ferric paratoluene sulfonate (III) as an oxidant and dopant. That is considered to contribute the increase of the electric conductivity of the electroconductive polymer.

EXAMPLE

Next, the present invention is described based on the Examples. However, the present invention should not be construed to limit the scope into the specific Examples. Note that in the Examples, the concentrations (%) of the solution, dilute solution, dispersion liquid and so on are based on mass % unless otherwise described.

Evaluation of the Electroconductive Composition

Example 1

3.58 ml of 75% butylamine phenolsulfonate aqueous solution (pH5) and 3.58 ml of 45% ammonium persulfate aqueous solution were charged into a vial container equipped with a stopple to mixed each other, and then, 150 μl of the mixture liquid was dropped on a ceramic plate having a size of 3 cm×4 cm which was left for 30 minutes at room temperature, onto which 100 μl of 25% 3,4-ethylenedioxythiophene solution (ethanol solution) was dropped and left for 5 minutes at room temperature, and a polymerization reaction was carried out at a temperature of 70° C. for a period of 30 minutes. After washing polyethylenedioxythiophene formed on the ceramic plate with excess amount of water, it was heated to dry at a temperature of 50° C. for a period of 1 hour, and further at a temperature of 150° C. for a period of 1 hour. The ratio in the mixture liquid between the butylamine phenolsulfonate aqueous solution and ammonium persulfate aqueous solution was 1 mole of butylamine phenolsulfonate and 0.65 moles of ammonium persulfate.

Example 2

Instead of the 75% butylamine phenolsulfonate aqueous solution (pH5), 45% of butylamine phenolsulfonate aqueous solution (pH5) was used. Other than that, the same procedure as used in Example 1 was used. In the mixture liquid of the butylamine phenolsulfonate aqueous solution and ammonium persulfate aqueous solution, the ratio was 1 mole of butylamine phenolsulfonate and 1.4 moles of ammonium persulfate.

Example 3

Instead of the 75% butylamine phenolsulfonate aqueous solution (pH5), 75% of butylamine cresolsulfonate aqueous solution (pH5) was used. Other than that, the same procedure as used in Example 1 was used. In the mixture liquid of the butylamine cresolsulfonate aqueous solution and ammonium persulfate aqueous solution, the ratio was 1 mole of butylamine cresolsulfonate and 0.69 moles of ammonium persulfate.

Example 4

Instead of the 75% butylamine phenolsulfonate aqueous solution (pH5), 75% 2-methylimidazole phenolsulfonate aqueous solution (pH5) was used. Other than that, the same procedure as used in Example 1 was used. In the mixture liquid between the 2-methylimidazole phenolsulfonate aqueous solution and ammonium persulfate aqueous solution, the ratio was 1 mole of 2-methylimidazole phenolsulfonate and 0.67 moles of ammonium persulfate.

Example 5

Instead of the 75% butylamine phenolsulfonate aqueous solution (pH5), 75% 4-methylimidazole phenolsulfonate aqueous solution (pH5) was used. Other than that, the same procedure as used in Example 1 was used. In the mixture liquid of the 4-methylimidazole phenolsulfonate aqueous solution and ammonium persulfate aqueous solution, the ratio was 1 mole of 4-methylimidazole phenolsulfonate and 0.67 moles of ammonium persulfate.

Example 6

Instead of the 75% butylamine phenolsulfonate aqueous solution (pH5), 75% methylamine phenolsulfonate aqueous solution (pH5) was used. Other than that, the same procedure as used in Example 1 was used. In the mixture liquid of the methylamine phenolsulfonate aqueous solution and ammonium persulfate aqueous solution, the ratio was 1 mole of methylamine phenolsulfonate and 0.54 moles of ammonium persulfate.

Comparative Example 1

Instead of the 75% butylamine phenolsulfonate aqueous solution (pH5), 75% butylamine sulfophthalate aqueous solution aqueous solution (pH5) was used. Other than that, the same procedure as used in Example 1 was used.

Comparative Example 2

Instead of the 75% butylamine phenolsulfonate aqueous solution (pH5), 45% butylamine paratoluenesulfonate aqueous solution aqueous solution (pH5) was used. Other than that, the same procedure as used in Example 1 was used.

Comparative Example 3

Instead of the 75% butylamine phenolsulfonate aqueous solution (pH5), 60% butylamine methoxybenzenesulfonate aqueous solution aqueous solution (pH5) was used. Other than that, the same procedure as used in Example 1 was used.

Comparative Example 4

Instead of the 75% butylamine phenolsulfonate aqueous solution (pH5), 60% butylamine ethylbenzenesulfonate aqueous solution aqueous solution (pH5) was used. Other than that, the same procedure as used in Example 1 was used.

Comparative Example 5

Instead of the 75% butylamine phenolsulfonate aqueous solution (pH5), 45% butylamine butylnaphthalenesulfonate aqueous solution aqueous solution (pH5) was used. Other than that, the same procedure as used in Example 1 was used.

Comparative Example 6

Instead of 7.16 ml of the oxidant and dopant solution including the mixture liquid of butylamine phenolsulfonate aqueous solution and ammonium persulfate aqueous solution, 7.16 ml of 40% ferric paratoluenesulfonate solution (butanol solution) was used. Other than that, the same procedure as used in Example 1 was used.

On the films of polyethylenedioxythiophene formed on the ceramic plate as prepared in accordance with Examples 1 to 6 and Comparative Examples 1 to 6, a load of 1.5 tons was applied to leave them for a period of 5 minutes in order to keep the film thickness even. Then, the surface resistance of the poly ethylenedioxythiophene was measured by using a four-probes conductivity detector in accordance with JIS K 7194 [MCP-T600 (trade name) manufactured by Mitsubishi Chemical Corporation] at room temperature (about at 25° C.). The results are shown in Table 1. The measurement of each sample was made at five points, which were averaged and rounded to the nearest whole number. However, in Comparative Example 1, no film was made, and the surface resistance could not be measured.

Also, the films of polyethylenedioxythiophene in accordance with Examples 1 to 6 and Comparative Examples 1 to 6, together with the ceramic plates, were left in a kept a constant-temperature bath at a temperature of 150° C. After the storage for a period of 100 hours, the plates were picked up, and the surface resistance of the polyethylenedioxy thiophene films was measured in the same manner as explained before. Based on the measurement results, the increase rate of the surface resistance due to the storage was researched. The results are also shown in Table 1. The increase rate of the surface resistance was calculated by dividing the surface resistance value after the storage by the initial surface resistance value (that is, the surface resistance value before the storage), which was shown by percent (%).

The formula for calculating the increase rate of the surface resistance is shown as follows:

[Increase rate of surface resistance]=[Surface resistance value after storage]/[initial surface resistance value]×100

TABLE 1

| | initial surface resistance value (Ω) | Surface resistance value after storage for 150 hours at 150° C. (Ω) | Increase rate of surface resistance (%) |
|---|---|---|---|
| Example 1 | 15 | 25 | 167 |
| Example 2 | 22 | 40 | 182 |
| Example 3 | 17 | 32 | 188 |
| Example 4 | 13 | 20 | 154 |
| Example 5 | 13 | 21 | 162 |
| Example 6 | 16 | 31 | 194 |
| Comp. Example 1 | N/A | N/A | — |
| Comp. Example 2 | $5 \times 10^3$ | $1 \times 10^7$ or more | — |
| Comp. Example 3 | $1 \times 10^3$ | $1 \times 10^7$ or more | — |
| Comp. Example 4 | $3 \times 10^5$ | $1 \times 10^7$ or more | — |
| Comp. Example 5 | $2 \times 104$ | $1 \times 10^7$ or more | — |
| Comp. Example 6 | 17 | 310 | 1824 |

As clearly shown in Table 1, Examples 1 to 6 showed a lower initial surface resistance and a higher electric conductivity than Comparative Examples 1 to 6. Also, Examples 1 to 6 showed a lower increase rate of the surface resistance due to storage, and therefore that the electric conductivity is less likely to be decreased in storage, compared with Comparative Example 6. In Examples 1 to 6, a film of polyethylenedioxythiophene whose surface is dense (clean), whereas in Comparative Examples 1 to 5, the film surfaces as formed were sparse. This is considered because the oxidant and dopant used in Examples 1 to 6 had a higher reaction efficiency to form polyethylenedioxythiophene than the oxidant and dopant used in Comparative Examples 1 to 5. In Comparative Example 6, a film as dense as Examples 1 to 6 was formed, but as explained above, Comparative Example 6 showed a higher increase rate of the surface resistance in storage, so that it was lack in the practicability, compared with Examples 1 to 6.

Next, the evaluation of the aluminum solid electrolytic capacitor is shown.

Example 7

After the surface of an aluminum foil was subjected to an etching treatment, and then applied to a chemical conversion treatment to form a dielectric layer, and a lead terminal of an positive electrode was attached thereon. Another lead terminal was attached to a negative electrode of an aluminum foil. A Capacitor element was prepared from the positive and negative electrodes with interposing a separator.

Then, 3.58 ml of 75% butylamine phenolsulfonate aqueous solution (pH5), 3.58 ml of 45% ammonium persulfate aqueous solution, 0.26 ml of 35% dimethyllaurylamine oxide aqueous solution, and 2 ml of 3,4-ethylenedioxythiophene were charged into a vial container equipped with a stopple to mixed each other. After stirring for a period of 10 minutes, the capacitor element was immersed quickly. After 1 minute, it was taken out, and a polymerization was carried out at room temperature for a period of 1 hour, and further at a temperature of 40° C. for a period of 20 minutes, and further at a temperature of 70° C. for a period of 30 minutes, and further at a temperature of 130° C. for a period of 1 hour, and further at a temperature of 180° C. for a period of 20 minutes to complete the polymerization. Then, it was housed in an aluminum housing case, which was sealed. Then, a rated voltage of 25V at a temperature of 130° C. was applied while aging it, so as to prepare an aluminum solid electrolytic capacitor. The ratio between phenolsulfonate butylamine and ammonium persulfate in the mixture was 1 mole of butylamine phenolsulfonate and 0.65 moles of ammonium persulfate.

Example 8

Instead of the 75% butylamine phenolsulfonate aqueous solution (pH5), 75% 2-methylimidazole phenolsulfonate aqueous solution (pH5) was used. Other than that, the same procedure as used in Example 7 was used. In the mixture liquid of the 2-methylimidazole phenolsulfonate aqueous solution and ammonium persulfate aqueous solution, the ratio was 1 mole of 2-methylimidazole phenolsulfonate and 0.67 moles of ammonium persulfate.

Example 9

Instead of 3.58 ml of the 75% butylamine phenolsulfonate aqueous solution (pH5), 2.58 ml of 75% butylamine phenolsulfonate aqueous solution (pH5) and 1 ml of 75% 3-(2-ethylhexyloxy) propylamine aqueous solution (pH5) was used. Other than that, the same procedure as used in Example 7 was used. In the mixture liquid used for the polymerization, the ratio between butylamine phenolsulfonate and ammonium persulfate was 1 mole of butylamine phenolsulfonate and 0.80 moles of ammonium persulfate.

Example 10

Instead of the 75% butylamine phenolsulfonate aqueous solution (pH5), 75% 2-methylimidazole cresolsulfonate aqueous solution (pH5) was used. Other than that, the same procedure as used in Example 7 was used. In the mixture liquid used for the polymerization, the ratio between 2-methylimidazole cresolsulfonate and ammonium persulfate was 1 mole of 2-methylimidazole cresolsulfonate and 0.69 moles of ammonium persulfate.

Example 11

Instead of the 75% butylamine phenolsulfonate aqueous solution (pH5), 75% phenolsulfonate 4-methylimidazole aqueous solution (pH5) was used. Other than that, the same procedure as used in Example 7 was used. In the mixture liquid used for the polymerization, the ratio between phenolsulfonate 4-methylimidazole and ammonium persulfate was 1 mole of phenolsulfonate 4-methylimidazole and 0.67 moles of ammonium persulfate.

Example 12

Instead of the 75% butylamine phenolsulfonate aqueous solution (pH5), 75% methylamine phenolsulfonate aqueous solution (pH5) was used. Other than that, the same procedure as used in Example 7 was used. In the mixture liquid used for the polymerization, the ratio between methylamine phenolsulfonate and ammonium persulfate was 1 mole of methylamine phenolsulfonate and 0.54 moles of ammonium persulfate.

Comparative Example 7

Instead of the 75% butylamine phenolsulfonate aqueous solution (pH5), 75% butylamine sulfophthalate aqueous solution (pH5) was used. Other than that, the same procedure as used in Example 7 was used.

Comparative Example 8

Instead of the 75% butylamine phenolsulfonate aqueous solution (pH5), 65% butylamine methoxybenzene sulfonate aqueous solution (pH5) was used. Other than that, the same procedure as used in Example 7 was used.

Comparative Example 9

Instead of the 75% butylamine phenolsulfonate aqueous solution (pH5), 45% butylamine paratoluenesulfonate aqueous solution (pH5) was used. Other than that, the same procedure as used in Example 7 was used.

Comparative Example 10

Instead of the 75% butylamine phenolsulfonate aqueous solution (pH5), 60% butylamine naphthalenesulfonate aqueous solution (pH5) was used. Other than that, the same procedure as used in Example 7 was used.

Comparative Example 11

Instead of the 75% butylamine phenolsulfonate aqueous solution (pH5), 75% naphthalenesulfonate aqueous solution (pH5) was used. Other than that, the same procedure as used in Example 7 was used.

Comparative Example 12

40% ferric paratoluene sulfonate (butanol solution) and 3,4-ethylenedioxythiophene were mixed at a mass ratio of 4:1. After strongly shaking for a period of 10 minutes, an aluminum solid electrolytic capacitor element was quickly immersed. Other than that, the same procedure as used in Example 7 was used.

Comparative Example 13

The same procedures as Example 7 were applied by using double-diluted reagents except for 3,4-ethylenedioxythiophene to polymerize them at room temperature for a period of 1 hour. These procedures were further repeated, and the polymerization was completed by heating at a temperature of 40° C. for a period of 20 minutes, and further at a temperature of 70° C. for a period of 30 minutes, and further at a temperature of 130° C. for a period of 1 hour, and further at a temperature of 180° C. for a period of 20 minutes. Then, an aluminum solid electrolytic capacitor was prepared in the same manner as Example 7.

Comparative Example 14

The same procedures as Example 13 were repeated except for using 1 ml of 3,4-ethylenedioxythiophene.

As to the aluminum solid electrolytic capacitor as prepared in accordance with Examples 7 to 12 and Comparative Examples 7 to 14, the capacitance, ESR (equivalent series resistance), and leak current were measured, and the occurrence of leak current defects was detected. The results are shown in Table 2. The capacitance, ESR (equivalent series resistance), and leak current, and the occurrence of leak current defects were measured or detected as follows.

Capacitance:

Using an LCR METER (4284A) manufactured by HEWLETT PACKARD Ltd., the capacitance was measured at 25° C. at 120 Hz.

ESR:

Using an LCR METER (4284A) manufactured by HEWLETT PACKARD Ltd., the capacitance was measured at 25° C. at 100 kHz.

Leak Current:

A rated voltage of 25V was applied to an aluminum solid electrolytic capacitor at a temperature of 25° C. for a period of 60 seconds, and then a leak current was measured by using a digital oscilloscope.

Occurrence of Leak Current Defects:

In the same manner as the measurement of the leak current, a leak current is measured, and when the leak current was above 83 μA, it was determined that there occurred leak current defects.

30 pieces of each sample were measured. The numbers in Table 2 for the capacitance, ESR and leak current are the averages of the 30 pieces, which are rounded to the nearest whole numbers. As to the results of the occurrence of the leak current defects, the total numbers of the tested capacitors are shown in the denominator, and the numbers of the capacitors that the leak current defects occurred are shown in the numerator. However, the leak current value is the average for the samples in which leak current defects did not occur.

TABLE 2

|  | Capacitance (μF) | ESR (mΩ) | Leak Current (μA) | Leak current defects |
|---|---|---|---|---|
| Example 7 | 30 | 31 | 8 | 0/30 |
| Example 8 | 35 | 30 | 10 | 0/30 |
| Example 9 | 32 | 32 | 9 | 0/30 |
| Example 10 | 27 | 34 | 13 | 0/30 |
| Example 11 | 31 | 30 | 10 | 0/30 |
| Example 12 | 30 | 29 | 11 | 0/30 |
| Comp. Example 7 | 2 | 1000 or more | — | — |
| Comp. Example 8 | 3 | 1000 or more | — | — |
| Comp. Example 9 | 2 | 1000 or more | — | — |
| Comp. Example 10 | 3 | 1000 or more | — | — |
| Comp. Example 11 | 2 | 1000 or more | — | — |
| Comp. Example 12 | 39 | 31 | 51 | 7/30 |
| Comp. Example 13 | 4 | 1000 or more | — | — |
| Comp. Example 14 | 4 | 1000 or more | — | — |

As shown in Table 2, the aluminum solid electrolytic capacitors of Examples 7 to 12 showed a larger capacitance and a lower ESR than the aluminum solid electrolytic capacitors of Comparative Examples 7 to 11, 13 and 14, and a less leak current and a less leak current defect than the aluminum solid electrolytic capacitor of Comparative Example 12.

As clearly shown in the results in Table 2, the aluminum solid electrolytic capacitors of Comparative Examples 7 to 11, 13 and 14 showed a lower capacitance and an excess ESR, so that they were not given properties necessary in using as a capacitor. Also, the capacitors of Comparative Example 12 had a capacitance and an ESR equivalent to the aluminum solid electrolytic capacitor of Examples 7 to 12, but there often occurred leak current defect, and even when leak current defect did not occur, the leak current was larger than that of the aluminum solid electrolytic capacitors of Examples 7 to 12, so that they were lack of practicality.

Next, twenty samples randomly selected from each of the aluminum solid electrolytic capacitors in accordance with Examples 7 to 10 and Comparative Example 12 were stored for a period of 1000 hours at a temperature of 105° C. Then, the capacitance, ESR, and leak current were measured and occurrence of the leak current defect was observed in the same manner as described before. The results are shown in Table 3. The values of the capacitance, ESR and leak current as shown in Table 3 are averages of twenties pieces, which are rounded to the nearest whole numbers.

TABLE 3

|  | Capacitance (μF) | ESR (mΩ) | Leak Current (μA) | Leak current defects |
|---|---|---|---|---|
| Example 7 | 28 | 34 | 12 | 0/20 |
| Example 8 | 33 | 33 | 13 | 0/20 |
| Example 9 | 29 | 35 | 10 | 0/20 |
| Example 10 | 25 | 36 | 16 | 0/20 |
| Comp. Example 12 | 36 | 45 | 68 | 3/20 |

As clearly shown if comparing the results in Table 2 with the results in Table 3, the aluminum solid electrolytic capacitor of Examples 7 to 10 showed less likely to decrease the capacitance, less likely to increase the ESR during storage, less likely to increase the leak current, and less likely to occur leak current defect, and therefore less likely to deteriorate during storage, resulting in high reliability for an extended time. On the other hand, the aluminum solid electrolytic capacitor of Comparative Example 12 showed more remarkable increase in the ESR and the leak current during the storage, generating leak current defects, thereby concluding that it was lack in long-term reliability, compared with the aluminum solid electrolytic capacitors of Examples 7 to 10.

Next, the evaluation for tantalum solid electrolytic capacitors is shown.

Evaluation of Tantalum Solid Electrolytic Capacitor

Example 13

Sintered tantalum was subjected to a chemical conversion treatment in which it was immersed in an aqueous phosphoric acid at a concentration of 0.1% while applying a voltage of 20V, so as to form a dielectric film on the surface of the sintered tantalum. Then, the sintered tantalum was immersed in a 3,4-ethylenedioxythiophene solution (ethanol solution) at a concentration of 35% for one minute, and then it was taken out to leave it for 5 minutes. Then, it was immersed in an oxidant and dopant solution including an emulsifier, that is, a mixture prepared beforehand. The mixture was composed of 50% butylamine phenolsulfonate aqueous solution (pH5), 30% ammonium persulfate aqueous solution and 20% dodecylamine oxide aqueous solution, mixed in a mass ratio of 200:200:1. After 30 seconds, it was taken out to leave it at room temperature for 10 minutes. Then, a polymerization was performed at a temperature of 70° C. for a period of 10 minutes. Then, the sintered tantalum was immersed in pure water to leave it for 30 minutes, and then it was taken out, which was subsequently dried at a temperature of 70° C. for 30 minutes. These sequential procedures were repeated ten times. Then, the polyethylenedioxythiophene layer was covered by a carbon paste and a silver paste to prepare a tantalum solid electrolytic capacitor. The ratio of the butylamine phenolsulfonate and ammonium persulfate in the oxidant and dopant solution was one mole of butylamine phenolsulfonate and 0.65 moles of ammonium persulfate.

Example 14

Instead of the 50% butylamine phenolsulfonate aqueous solution (pH5), 50% 2-methylimidazole phenolsulfonate aqueous solution (pH5) was used. Other than that, the same procedure as used in Example 13 was used. In the oxidant and dopant solution of the 2-methylimidazole phenolsulfonate and ammonium persulfate, the ratio was 1 mole of 2-methylimidazole phenolsulfonate and 0.67 moles of ammonium persulfate.

Example 15

Instead of the 50% butylamine phenolsulfonate aqueous solution (pH5), a mixture aqueous solution of 50% 2-methylimidazole phenolsulfonate aqueous solution (pH5) and 50% butylamine phenolsulfonate aqueous solution (pH5) in a mass ratio of 7:3 was used. Other than that, the same procedure as used in Example 13 was used. In the oxidant and dopant solution of the 2-methylimidazole phenolsulfonate, butylamine phenolsulfonate and ammonium persulfate, the ratio was 1 mole in total of 2-methylimidazole phenolsulfonate and butylamine phenolsulfonate, and 0.67 moles of ammonium persulfate.

Example 16

Instead of the 50% butylamine phenolsulfonate aqueous solution (pH5), 70% 2-methylimidazole phenolsulfonate aqueous solution (pH5) was used. Instead of the 30% ammonium persulfate aqueous solution, 45% ammonium persulfate aqueous solution was used. The procedures were repeated 8 times in stead of 10 times. Other than those steps, the same procedure as used for Example 13 was used. In the oxidant and dopant solution of the 2-methylimidazole phenolsulfonate and ammonium persulfate, the ratio was 1 mole of 2-methylimidazole phenolsulfonate and 0.67 moles of ammonium persulfate.

Comparative Example 15

Instead of the 50% butylamine phenolsulfonate aqueous solution (pH5), 50% sulfophthalic acid butylamine aqueous solution (pH5) was used. The polymerization was repeated 18 times. Other than that, the same procedure as used for Example 13 was used.

Comparative Example 16

Instead of the 50% butylamine phenolsulfonate aqueous solution (pH5), 50% butylamine methoxybenzene sulfonate aqueous solution (pH5) was used. The polymerization was repeated 18 times. Other than that, the same procedure as used for Example 13 was used.

Comparative Example 17

Instead of the 50% butylamine phenolsulfonate aqueous solution (pH5), 45% butylamine paratoluene sulfonate aqueous solution (pH5) was used. The polymerization was repeated 18 times. Other than that, the same procedure as used for Example 13 was used.

Comparative Example 18

Instead of the oxidant and dopant solution of Example 13, 35% ferric paratoluene sulfonate solution (ethanol solution) was used. Other than that, the same procedure as used for Example 13 was used.

As to the tantalum solid electrolytic capacitor of Examples 13 to 16 and Comparative Examples 15 to 18, the capacitance and ESR were measured in the same manner as Example 7. The results are shown in Table 4. The measurement was made on twenty pieces in each sample, which are averaged and rounded to the nearest whole number.

TABLE 4

|  | Capacitance (μF) | ESR (mΩ) |
| --- | --- | --- |
| Example 13 | 151 | 18 |
| Example 14 | 155 | 17 |
| Example 15 | 153 | 17 |
| Example 16 | 150 | 17 |
| Comp. Example 15 | 63 | More than 1000 |
| Comp. Example 16 | 79 | More than 1000 |
| Comp. Example 17 | 45 | More than 1000 |
| Comp. Example 18 | 152 | 17 |

As shown in Table 4, the tantalum solid electrolytic capacitors of Examples 13 to 16 had a larger capacitance and a smaller ESR than the tantalum solid electrolytic capacitors of Comparative Examples 15 to 17. Thus, the Examples were superior in the properties of the tantalum solid electrolytic capacitor. On the other hand, the tantalum solid electrolytic capacitors of Comparative Examples 15 to 17 had a larger ESR than the tantalum solid electrolytic capacitors of Examples 13 to 16, so that the Comparative Examples were concluded inappropriate as capacitors. It is noted that the tantalum solid electrolytic capacitor of Comparative Example 18 had a capacitance and an ESR that are in similar levels to Examples 13 to 16, but as shown hereinafter, the ESR was largely increased when Comparative Example 18 was stored in a high temperature, so that it was founded that it had an objective in the storage properties. Also, in Comparative Examples 15 to 18, it was necessary to repeat the polymerization 18 times because the reaction efficiency of the oxidant and dopant was low.

Next, twenty pieces of each of the tantalum solid electrolytic capacitors of the Examples 13 to 15 and Comparative Example 18 were selected randomly, which were stored at a temperature of 125° C. for a period of 200 hours. Then, the capacitance and ESR were measured in the same way as described before. The results are shown in Table 5. The numbers in the table is the average of the twenty pieces, which are rounded to the nearest whole number.

TABLE 5

|  | Capacitance (μF) | ESR (mΩ) |
|---|---|---|
| Example 13 | 148 | 25 |
| Example 14 | 149 | 24 |
| Example 15 | 148 | 24 |
| Comp. Example 18 | 140 | 89 |

As clearly shown in the comparison of the results in Table 4 with the results in Table 5, the tantalum solid electrolytic capacitors of Examples 13 to 15 were less likely to decrease the capacitance and less likely to increase the ESR when they were stored in a high temperature, so that the results showed that the Examples were less likely to decrease the performances during storage, showing a long-term reliability. On the other hand, the tantalum solid electrolytic capacitor of Comparative Example 18 largely increased the ESR during storage, and found that it had an objective in the storage properties, lacking in the long-term reliability.

Next, the tantalum solid electrolytic capacitors of Examples 13 to 15 were disassembled, and the capacitor elements, exposing the electroconductive polymer (that is, 3,4-ethylenedioxythiophene polymer in which a dopant is incorporated to be polymerized to show a conductivity) as a solid electrolyte, were inspected by means of an ESCA (photoelectric spectroscopy) to identify the S (sulfur) of the dopant and the S (sulfur) of 3,4-ethylenedioxy thiophene of the constituent monomer. Each capacitor was measured for five pieces, which were averaged to obtain a molar ratio of the S of the dopant and the S of the monomer. The results are shown in Table 6.

TABLE 6

|  | Molar ratio of S of the dopant and S of the monomer |
|---|---|
| Example 13 | S of the dopant:S of the monomer = 1.0:1.2 |
| Example 14 | S of the dopant:S of the monomer = 1.0:2.3 |
| Example 15 | S of the dopant:S of the monomer = 1.0:1.7 |

As described before, Synthetic Metals, 101, 561-564 (1999), K. E. Aasmundtveut reports that ferric paratoluene sulfonate (III) was used as an oxidant and dopant to polymerize 3,4-ethylenedioxythiophene, and subsequently washed and dried to obtain an electroconductive polymer. The analysis of the polymer showed that the molar ratio of the S (sulfur) of the paratoluene sulfonate as the dopant and the S (sulfur) of the 3,4-ethylenedioxy thiophene as a monomer was 1:4 regardless of the charged ratio. That is, the molar ratio of the dopant and monomers was 1:4.

On the other hand, in the electroconductive polymer of the capacitors as the Examples in accordance with the present invention, the molar ratio of the dopant and monomer was 1.0:1.2 to 1.0:2.3 as shown in Table 6. That is, the oxidant and dopant of the present invention had a higher molar ratio of the dopant with respect to the monomer, compared with that prepared by using ferric paratoluene sulfonate as an oxidant and dopant. The dopant, included in the electroconductive polymer of the tantalum solid electrolytic capacitor as Examples 13 to 15, was measured as follows: It was dedoped by an ammonia aqueous solution, and measured by LC-MS (liquid chromatography mass spectrum: JMS-T100LC (commercial name) manufactured by JEOL Ltd.). By the measurement, sulfuric acid and phenol sulfonate were detected.

INDUSTRIAL APPLICABILITY

As explained above, according to the present invention, an electroconductive composition having an electric conductivity can be obtained. Also, by using the electroconductive composition as a solid electrolyte, a solid electrolytic capacitor having a long-term reliability can be obtained. Also, according to the oxidant and dopant solution of the present invention, an electroconductive composition in accordance with the present invention can be prepared at high reaction efficiency. The dopant solution of the present invention can form an oxidant and dopant solution in accordance with the present invention.

The invention claimed is:

1. A dopant solution for an electroconductive polymer, comprising:
at least one salt selected from the group consisting of an alkylamine salt and an imidazole salt of a benzene skeleton sulfonic acid or a naphthalene skeleton sulfonic acid, said skeleton having at least one OH group and at least one sulfonate group, at a concentration of 40 mass % or more.

2. A dopant solution for an electroconductive polymer according to claim 1, wherein the salt is included at a concentration of 70 mass % or more.

3. A dopant solution for an electroconductive polymer according to claim 1, further comprising an emulsifier.

4. A dopant solution for an electroconductive polymer according to claim 3, wherein the emulsifier is an alkylamine oxide having an alkyl group with a carbon number of 1 to 20.

5. A dopant solution for an electroconductive polymer according to claim 1, wherein an alkylamine of the alkylamine salt has an alkyl group with a carbon number of 1 to 12.

6. A dopant solution for an electroconductive polymer according to claim 1, wherein the imidazole of the imidazole salt has a substituted group of an alkyl group or a phenyl group having a carbon number of 1 to 20, at the second or fourth position thereof.

7. A dopant solution for an electroconductive polymer according to claim 1, having a pH value of 1 or more.

8. A dopant solution for an electroconductive polymer according to claim 7, having a pH value of 4 or more.

9. A dopant solution for an electroconductive polymer according to claim 1, wherein the imidazole salt includes 2-methyl imidazole phenol sulfonate, 4-methyl imidazole phenol sulfonate, 2-methyl imidazole cresol sulfonate or 4-methyl imidazole cresol sulfonate.

10. A dopant and oxidant solution for an electroconductive polymer, comprising:
    a mixture, serving as an oxidant and dopant, comprising:
        at least one salt selected from the group consisting of an alkylamine salt and an imidazole salt of a benzene skeleton sulfonic acid or a naphthalene skeleton sulfonic acid, said skeleton having at least one OH group and at least one sulfonate group; and
        a persulfate organic salt,
    wherein the persulfate organic salt is included at an amount of 0.3 to 2.0 moles, per one mole of the salt.

11. A dopant solution for an electroconductive polymer according to claim 1, further comprising a persulfate organic salt dissolved, serving as a dopant and oxidant solution.

12. A dopant and oxidant solution for an electroconductive polymer according to claim 10, wherein the oxidant and dopant is included at a concentration of 40 mass % or more.

13. A dopant and oxidant solution for an electroconductive polymer according to claim 10, wherein the imidazole salt includes 2-methyl imidazole phenolsulfonate, 4-methylimidazole phenolsulfonate, 2-methylimidazole cresolsulfonate or 4-methylimidazole cresolsulfonate.

14. An electroconductive composition, comprising; a polymer polymerized by the steps comprising:
    providing a mixture of at least one salt selected from the group consisting of an alkylamine salt and an imidazole salt of a benzene skeleton sulfonic acid or a naphthalene skeleton sulfonic acid, said skeleton having at least one OH group and at least one sulfonate group; and a persulfate organic salt, serving as an oxidant and a dopant; and
    polymerizing a monomer, selected from the group consisting of thiophene and derivatives thereof, pyrrole and derivatives thereof.

15. An electroconductive composition according to claim 14, wherein the alkylamine has an alkyl group with a carbon number of 1 to 12.

16. An electroconductive composition according to claim 14, wherein an imidazole of the imidazole salt has a substituted group of an alkyl group or a phenyl group having a carbon number of 1 to 20, at the second or fourth position thereof.

17. An electroconductive composition according to claim 14, wherein the persulfate organic salt is ammonium persulfate.

18. A method for producing an electroconductive composition, comprising:
    providing an oxidant and dopant, comprising:
        at least one salt selected from the group consisting of an alkylamine salt and an imidazole salt of a benzene skeleton sulfonic acid or a naphthalene skeleton sulfonic acid, said skeleton having at least one OH group and at least one sulfonate group; and
        a persulfate organic salt, and
    polymerizing at least one monomer selected from the group consisting of thiophene and derivatives thereof, pyrrole and derivatives thereof, and aniline and derivatives thereof.

19. A method for producing an electroconductive composition, comprising:
    providing an oxidant and dopant, comprising: at least one salt selected from the group consisting of an alkylamine salt and an imidazole salt of a benzene skeleton sulfonic acid or a naphthalene skeleton sulfonic acid, said skeleton having at least one OH group and at least one sulfonate group; and a persulfate organic salt, provided in a solution;
    polymerizing at least one monomer selected from the group consisting of thiophene and derivatives thereof, pyrrole and derivatives thereof, and aniline and derivatives thereof, in the presence of the oxidant and the dopant.

20. A method for producing an electroconductive composition according to claim 19, wherein the solution of the oxidant and dopant has a concentration of 25 mass % or more.

21. A method for producing an electroconductive composition according to claim 19, wherein the solution of the oxidant and dopant has a concentration of 30 mass % or more, and has a pH value of 1 or more.

22. A method for producing an electroconductive composition according to claim 21, wherein the solution of the oxidant and dopant has a pH value of 4 or more.

23. A method for producing an electroconductive composition according to claim 22, wherein the solution of the oxidant and dopant further comprises an emulsifier.

24. A method for producing an electroconductive composition according to claim 23, wherein the emulsifier is an alkylamine oxide having an alkyl group with a carbon number of 1 to 20.

25. A method for producing an electroconductive composition according to claim 21, wherein the solution of the oxidant and dopant has a concentration of 55 mass % or more.

26. A solid electrolytic capacitor, comprising:
    an electroconductive composition as a solid electrolyte, wherein the electroconductive composition is obtained by the steps, comprising:
        providing an oxidant and a dopant, wherein the oxidant and dopant comprises at least one selected from the group consisting of an alkylamine salt and an imidazole salt of a benzene skeleton sulfonic acid or a naphthalene skeleton sulfonic acid, said skeleton having at least one OH group and at least one sulfonate group; and a persulfate organic salt; and
        polymerizing a monomer, selected from the group consisting of thiophene and derivatives thereof, pyrrole and derivatives thereof, and aniline and derivatives thereof, in the presence of the oxidant and dopant.

27. A solid electrolytic capacitor according to claim 26, wherein an alkyl amine of the alkylamine salt has an alkyl group with a carbon number of 1 to 12.

28. A solid electrolytic capacitor according to claim 26, wherein an imidazole of the imidazole salt has a substituted group of an alkyl group or a phenyl group having a carbon number of 1 to 20, at the second or fourth position thereof.

29. A solid electrolytic capacitor according to claim 26, wherein the persulfate organic salt is persulfate ammonium.

30. A solid electrolytic capacitor according to claim 26, wherein a molar ratio of the dopant and the monomer in a polymer obtained in the steps is 1:0.1 to 1:3.

31. A method for producing a solid electrolytic capacitor, comprising: wherein
    providing a solution of an oxidant and dopant, the oxidant and dopant comprising a mixture of at least one selected from the group consisting of an alkylamine salt and an imidazole salt of a benzene skeleton sulfonic acid or a naphthalene skeleton sulfonic acid, said skeleton having at least one OH group and at least one sulfonate group; and a persulfate organic salt,
    polymerizing at least one monomer in the presence of the oxidant and dopant, wherein the monomer is selected from the group consisting of thiophene and derivatives thereof, pyrrole and derivatives thereof, and aniline and derivatives thereof, is polymerized to prepare an electroconductive composition, and
    using the electroconductive composition as a solid electrolyte to prepare a solid electrolytic capacitor.

32. A method for producing a solid electrolytic capacitor according to claim 31, wherein a solution of the oxidant and dopant has a concentration of 25 mass % or more.

33. A method for producing a solid electrolytic capacitor according to claim 31, wherein the solution of the oxidant and dopant has a concentration of 30 mass % or more, and has a pH value of 1 or more.

34. A method for producing a solid electrolytic capacitor according to claim 33, wherein the solution of the oxidant and dopant has a pH value of 4 or more.

35. A method for producing a solid electrolytic capacitor according to claim 33, wherein the solution of the oxidant and dopant has a concentration of 55 mass % or more.

36. A method for producing a solid electrolytic capacitor according to claim 31, wherein the solution of the oxidant and dopant further comprises an emulsifier.

37. A method for producing a solid electrolytic capacitor according to claim 36, wherein the emulsifier is an alkylamine oxide having an alkyl group with a carbon number of 1 to 20.

38. A method for producing a solid electrolytic capacitor according to claim 31, wherein a capacitor element is alternatively immersed into the monomer and the solution of the oxidant and dopant.

* * * * *

UNITED STATES PATENT AND TRADEMARK OFFICE
CERTIFICATE OF CORRECTION

| | |
|---|---|
| PATENT NO. | : 7,651,637 B2 |
| APPLICATION NO. | : 11/815814 |
| DATED | : January 26, 2010 |
| INVENTOR(S) | : Ryosuke Sugihara |

It is certified that error appears in the above-identified patent and that said Letters Patent is hereby corrected as shown below:

In the claims:

Col. 21, line 12 of claim 14, please add the phrase --, and aniline and derivative thereof-- after the term "thereof."

Signed and Sealed this
Fourth Day of January, 2011

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,651,637 B2 |
| APPLICATION NO. | : 11/815814 |
| DATED | : January 26, 2010 |
| INVENTOR(S) | : Sugihara |

It is certified that error appears in the above-identified patent and that said Letters Patent is hereby corrected as shown below:

In the claims;

At line 3 of claim 13, delete the terms "2-methyl imidazole" and add the term --2-methylimidazole-- after the term "includes" at line 3 of claim 13.

In claim 23, delete the phrase "A method for producing an electroconductive composition according to claim 22, wherein the solution of the oxidant and dopant further comprises an emulsifier," and add the phrase --A method for producing an electroconductive composition according to claim 21, wherein the solution of the oxidant and dopant has a concentration of 55 mass % or more.-- in claim 23.

In claim 24, delete the phrase "A method for producing an electroconductive composition according to claim 23, wherein the emulsifier is an alkylamine oxide having an alkyl group with a carbon number of 1 to 20," and add the phrase --A method for producing an electroconductive composition according to claim 22, wherein the solution of the oxidant and dopant further comprises an emulsifier.-- in claim 24.

In claim 25, delete the phrase "A method for producing an electroconductive composition according to claim 21, wherein the solution of the oxidant and dopant has a concentration of 55 mass % or more," and add the phrase --A method for producing an electroconductive composition according to claim 24, wherein the emulsifier is an alkylamine oxide having an alkyl group with a carbon number of 1 to 20.-- in claim 25.

Signed and Sealed this
Tenth Day of January, 2012

David J. Kappos
*Director of the United States Patent and Trademark Office*

CERTIFICATE OF CORRECTION (continued)
U.S. Pat. No. 7,651,637 B2

In claim 27, delete the terms "alkyl amine" and add the term --alkylamine-- before the term "of" at line 2 of claim 27.

UNITED STATES PATENT AND TRADEMARK OFFICE
CERTIFICATE OF CORRECTION

PATENT NO.          : 7,651,637 B2
APPLICATION NO.     : 11/815814
DATED               : January 26, 2010
INVENTOR(S)         : Sugihara It is certified that error appears in the above-identified patent and that said Letters Patent is hereby corrected as shown below:

In the claims;

Column 21, line 41 (Claim 13, line 3) delete the terms "2-methyl imidazole" and add the term --2-methylimidazole-- after the term "includes" at line 3 of claim 13.

In claim 23, column 22, lines 38-40 delete the phrase "A method for producing an electroconductive composition according to claim 22, wherein the solution of the oxidant and dopant further comprises an emulsifier," and add the phrase --A method for producing an electroconductive composition according to claim 21, wherein the solution of the oxidant and dopant has a concentration of 55 mass % or more.-- in claim 23.

In claim 24, column 22, lines 41-44 delete the phrase "A method for producing an electroconductive composition according to claim 23, wherein the emulsifier is an alkylamine oxide having an alkyl group with a carbon number of 1 to 20," and add the phrase --A method for producing an electroconductive composition according to claim 22, wherein the solution of the oxidant and dopant further comprises an emulsifier.-- in claim 24.

In claim 25, column 22, lines 45-47 delete the phrase "A method for producing an electroconductive composition according to claim 21, wherein the solution of the oxidant and dopant has a concentration of 55 mass % or more," and add the phrase --A method for producing an electroconductive composition according to claim 24, wherein the emulsifier is an alkylamine oxide having an alkyl group with a carbon number of 1 to 20.-- in claim 25.

This certificate supersedes the Certificate of Correction issued January 10, 2012.

Signed and Sealed this
Fourteenth Day of February, 2012

David J. Kappos
*Director of the United States Patent and Trademark Office*

CERTIFICATE OF CORRECTION (continued)
U.S. Pat. No. 7,651,637 B2

In claim 27, column 22, line 64 (claim 27, line 2) delete the terms "alkyl amine" and add the term --alkylamine-- before the term "of" at line 2 of claim 27.